(12) United States Patent
Kujirai

(10) Patent No.: US 6,965,953 B2
(45) Date of Patent: Nov. 15, 2005

(54) INFORMATION PROCESSING APPARATUS, METHOD FOR CONTROLLING INFORMATION PROCESSING APPARATUS, AND STORAGE MEDIUM STORING PROGRAM FOR REALIZING THE METHOD

(75) Inventor: Yasuhiro Kujirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 10/359,641

(22) Filed: Feb. 7, 2003

(65) Prior Publication Data

US 2003/0154323 A1 Aug. 14, 2003

(30) Foreign Application Priority Data

Feb. 14, 2002 (JP) ........................................ 2002-037037
Jan. 14, 2003 (JP) ........................................ 2003-005889

(51) Int. Cl.[7] .............................................. G06F 3/00
(52) U.S. Cl. .............................. 710/62; 710/8; 710/10; 345/808
(58) Field of Search ............................... 710/8, 10, 73, 710/62; 345/700, 808

(56) References Cited

U.S. PATENT DOCUMENTS 5,748,980 A * 5/1998 Lipe et al. ...................... 710/8
6,417,931 B2 7/2002 Mori et al. .................. 358/1.15
6,580,521 B1 6/2003 Nishikawa et al. ......... 358/1.18
6,754,722 B2 * 6/2004 Herzi ............................ 710/8

FOREIGN PATENT DOCUMENTS

JP  10-320184  12/1998

OTHER PUBLICATIONS

UpdateDriverForPlugAndPlayDevices, www.osr.com (Apr. 11, 2003).*

* cited by examiner

Primary Examiner—Kim Huynh
(74) Attorney, Agent, or Firm—Fitzpatrick, Cella, Harper & Scinto

(57) ABSTRACT

A control method for an information processing apparatus which can be loaded with a device driver includes an installing step of installing a device driver, a determining step of determining whether or not a control program in the information processing apparatus is to be rebooted when the device driver is installed in the installing step, and a display controlling step of controlling display of a display screen for reboot when it is determined that reboot is required in the determining step.

20 Claims, 14 Drawing Sheets

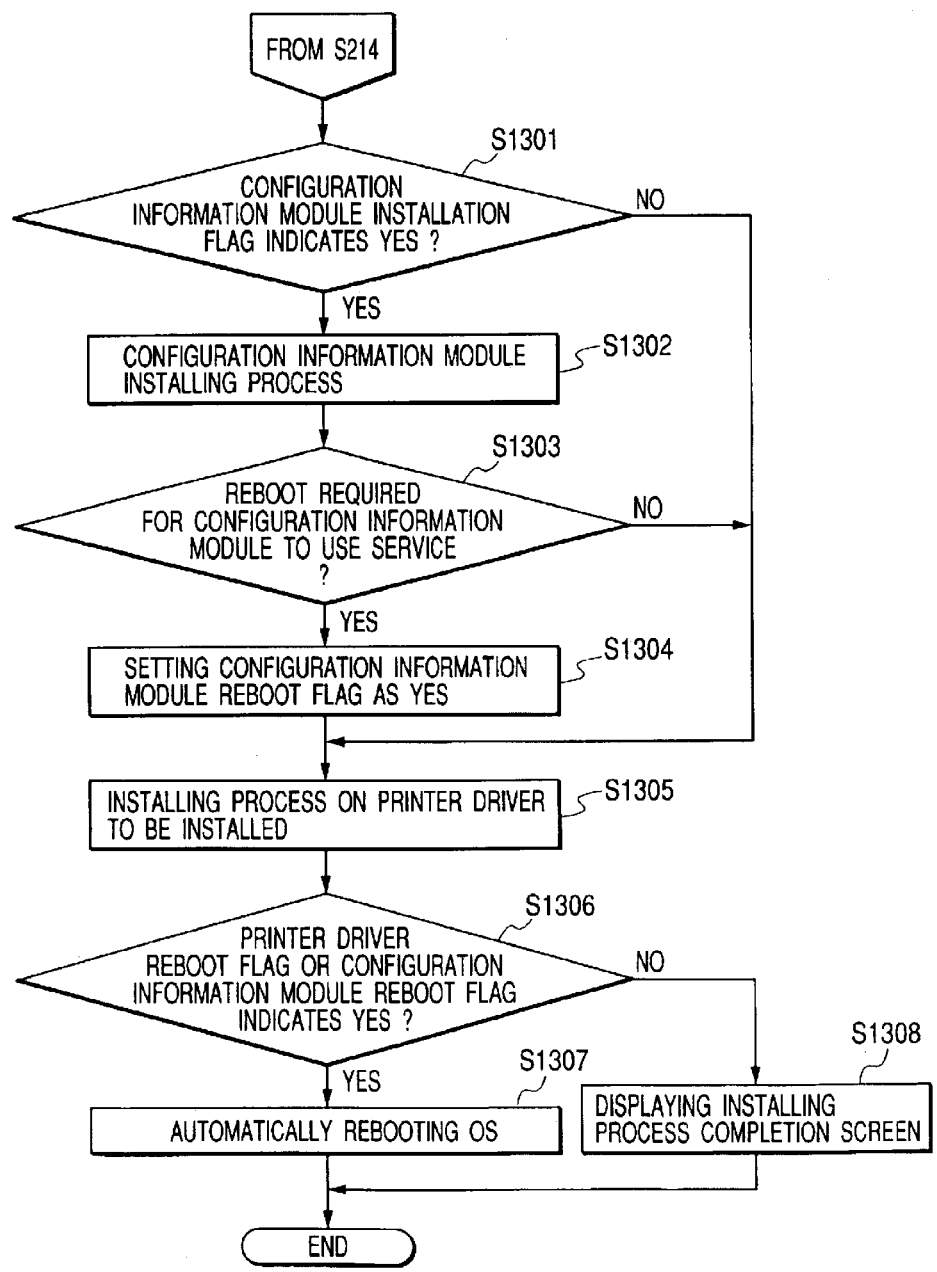

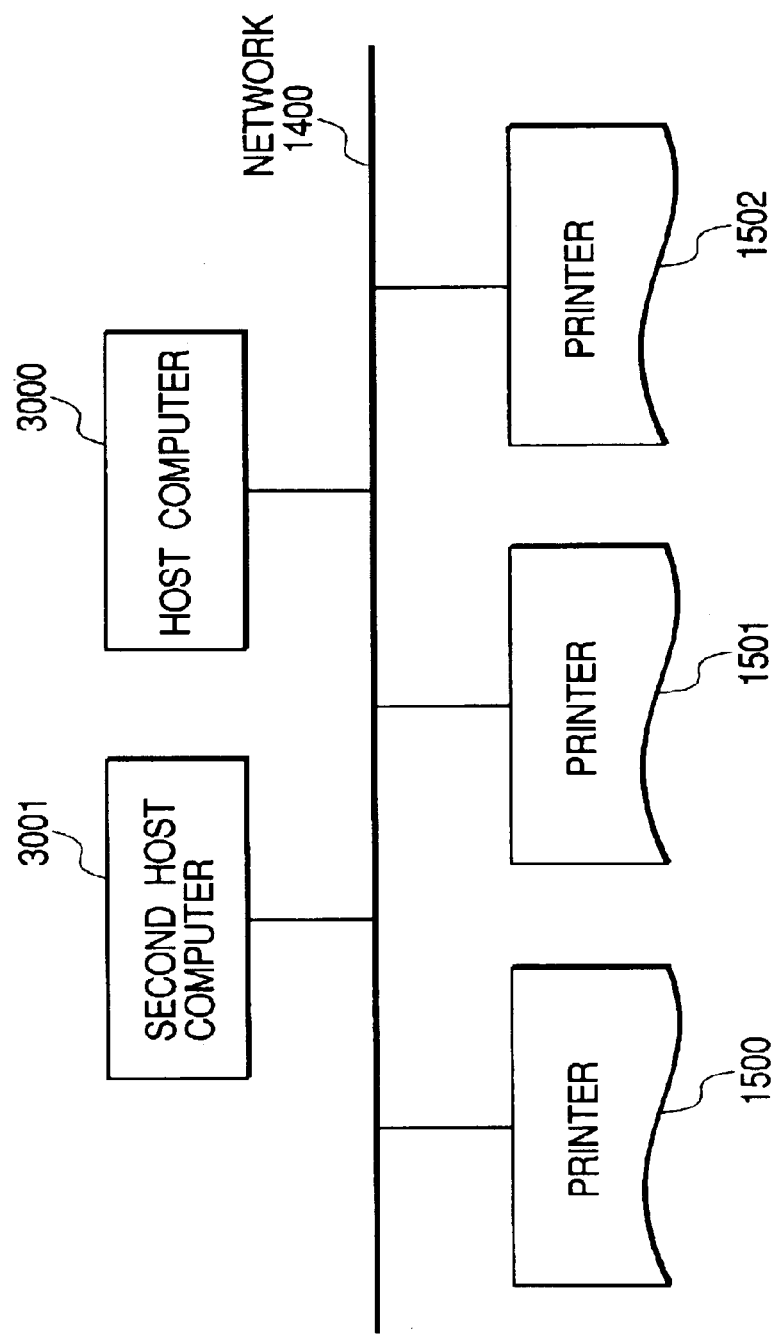

FIG. 15

| CONFIGURATION FILE AND FILE VERSION OF DRIVER ALREADY INSTALLED (1501) | | CONFIGURATION FILE AND FILE VERSION OF DRIVER TO BE INSTALLED (1502) | |
|---|---|---|---|
| PSDRV. DLL | (5.0.0) | PCLDRV. DLL | (4.0.0) |
| PSDRVUI. DLL | (5.0.0) | PCLDRVUI. DLL | (4.0.0) |
| : | : | : | : |
| COLORMOD. DLL | (1.9.0) | COLORMOD. DLL | (1.9.4) |
| DEVICEA. DAT | N/A | DEVICEB. DAT | N/A |

↓

| CONFIGURATION FILE AND FILE VERSION AFTER INSTALLATION | | CONFIGURATION FILE AND FILE VERSION OF INSTALLED DRIVER | | TO BE REBOOTED ? |
|---|---|---|---|---|
| PSDRV. DLL | (5.0.0) | PCLDRV. DLL | (4.0.0) | NO |
| PSDRVUI. DLL | (5.0.0) | PCLDRVUI. DLL | (4.0.0) | NO |
| : | : | : | : | : |
| COLORMOD. DLL | (1.9.4) | COLORMOD. DLL | (1.9.4) | REBOOT REQUIRED |
| DEVICEA. DAT | N/A | DEVICEB. DAT | N/A | NO |

INFORMATION PROCESSING APPARATUS, METHOD FOR CONTROLLING INFORMATION PROCESSING APPARATUS, AND STORAGE MEDIUM STORING PROGRAM FOR REALIZING THE METHOD

BACKGROUND OF THE INVENTION

1. Field of the Invention

The present invention relates to an information processing apparatus connectable to a peripheral device, a storage medium storing a control program for controlling the information processing apparatus, etc.

2. Related Background Art

Recently, the arithmetic ability of a computer has remarkably been improved with an operating system (OS) using a graphical user interface (GUI) adopted, and with a driver program for control of a peripheral device installed much more easily than a character user interface (CUI).

In an environment loaded with a common OS, a standard installer development environment has been provided. When an installer of a device driver is generated, it is considered to be easily developed by implementing only a necessary function for the installation of the device driver following the operation flow provided by the development environment. Thus, an installer developed in the development environment has been distributed and used.

When an installing process is performed on a device driver, it is common and safe means to reboot an OS to normally operate a device driver and allows the OS to perform an initializing process on the system. At this time, on the last process screen (FIG. 6) of the installer, a selection specification screen for selection by the user as to whether the reboot is to be performed immediately or later can be displayed on the screen of the computer.

When the reboot is to be avoided, the user requests the computer and specifies through the selection specification screen the selection of the reboot to be performed after necessary processes so that the reboot can be suppressed immediately after the installing process. For example, when a device driver is installed in the daylong operating computer, a user may avoid the reboot to the utmost after the installing process. On the other hand, in installing a device driver, there can be a case in which the operation of a system is guaranteed without reboot depending on conditions.

However, the system in which a device driver is installed uniformly displays a fixed reboot specification input screen without determination as to whether or not the reboot is required. Therefore, there is the problem that it is necessary for a user to determine the necessity of rebooting a system. To determine whether or not the system reboot is required, special knowledge about an OS, a device driver, a service provided by the system, etc. is required. As a result, it is difficult for a common user to independently determine the necessity.

Furthermore, if a user operates a computer without appropriately determining the necessity of rebooting the system, there occurs the problem that the system does not appropriately operate as a result of no rebooting operation although the system requires the rebooting operation. On the other hand, there also occurs the problem that, since the user cannot determine the necessity of rebooting the system, the system is unnecessarily rebooted when the reboot is not required.

SUMMARY OF THE INVENTION

The present invention has been developed to solve the above mentioned problem, and aims at providing a system of: determining whether or not reboot is required when a device driver is installed in a computer; controlling a system on the installation side based on the determination result; avoiding unnecessary reboot while performing necessary reboot, and performing an appropriate installing process of a software module.

Another object of the present invention is to: determine whether or not reboot is required when a device driver is installed in a computer; display a screen about reboot by configuring it based on the determination result; release a user from the difficult determination as to whether or not the reboot is required; and perform an appropriate installing process.

To solve at least one of the above-mentioned problems, the following mean is provided in the embodiments of the present invention.

For example, an embodiment of the present invention is a control method of an information processing apparatus which can be loaded with a device driver, and includes: an installing step of installing a device driver; a determining step of determining whether or not a control program in the information processing apparatus is to be rebooted when the device driver is installed in the installing step; and a display controlling step of controlling the display of a display screen for reboot when it is determined that reboot is required in the determining step. Additionally, the apparatuses, etc. applied for the above-mentioned methods are disclosed.

Other features and advantageous of the present invention will be apparent from the following description taken in conjunction with the accompanying drawings, in which like reference characters designate the same or similar parts throughout thereof.

BRIEF DESCRIPTION OF THE DRAWINGS

FIG. 13 shows an example of a variation of the process shown in FIG. 3;

FIG. 14 shows a preferable printer system as an embodiment of the present invention;_

FIG. 15 shows a preferable case to which a variation sample of an embodiment of the present invention is applied.

DESCRIPTION OF THE PREFERRED EMBODIMENTS

The embodiments of the present invention are described below in detail by referring to the attached drawings.
(First Embodiment)

Figure 1:
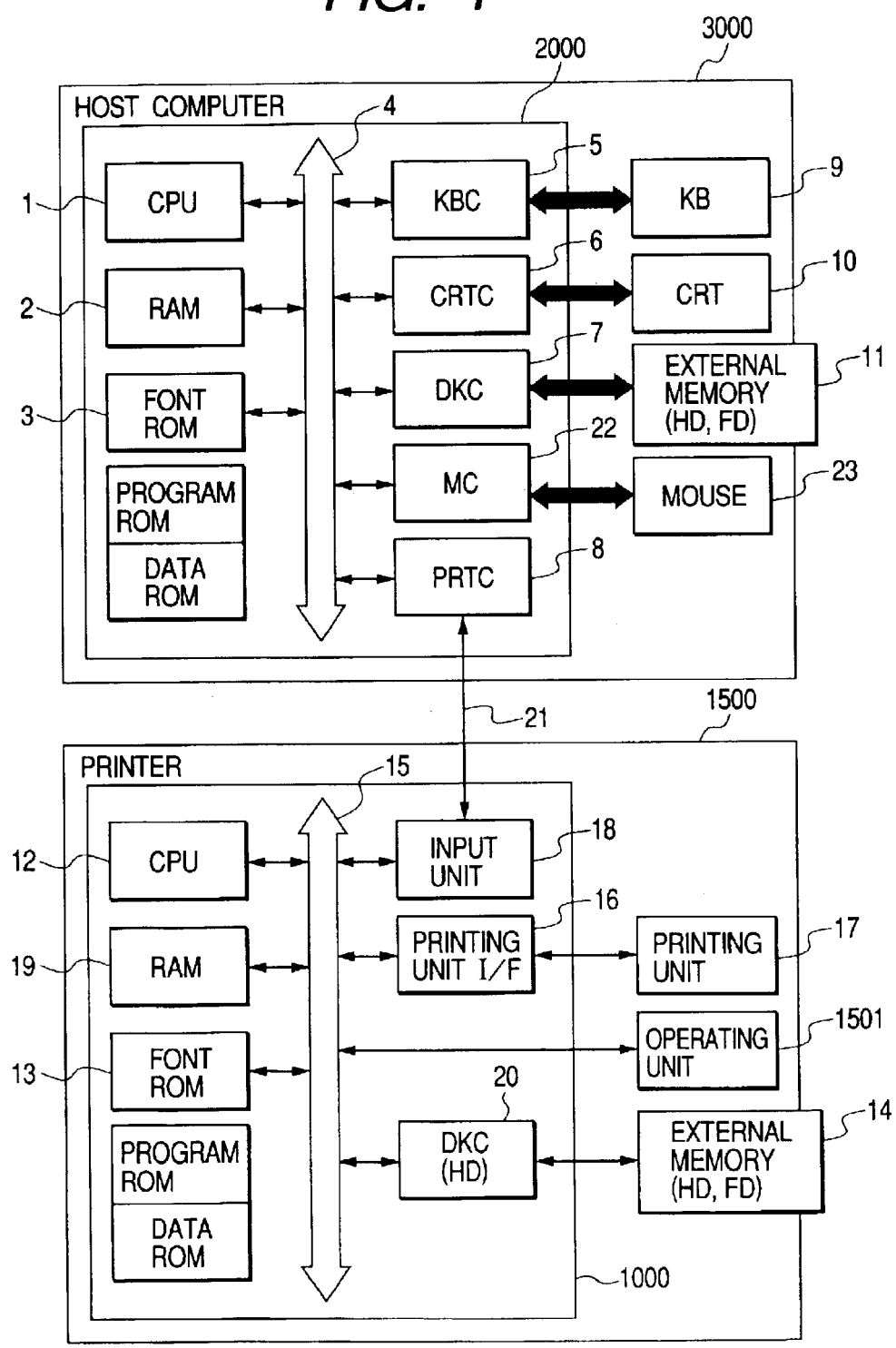
FIG. 1 is a block diagram of the configuration of a printer control system according to an embodiment of the present invention.

FIG. 1 is a block diagram of the configuration of the printer control system as an example of an embodiment of the present invention. A single device, a system comprising a plurality of devices, or a system performing a process connected through a network such as a LAN, a WAN, etc. can realize an embodiment of the present invention as far as the functions of the present invention can be performed.

In FIG. 1, a host computer 3000 which is a preferable example of the information processing apparatus according to the present invention comprises a CPU 1 for performing a document process in which graphics, images, characters, table (including spreadsheets, etc.), etc. exist in a mixed manner based on a document process program, etc. stored in ROM for a program of ROM 3, external memory 11, and the CPU 1 totally controls each device connected to a system bus 4. Additionally, the ROM for a program of the ROM 3 or the external memory 11 which is storage means stores an operating system program (hereinafter referred to as an OS), etc. which is a control program of the CPU 1, stores in the ROM for font in the ROM 3, the external memory 11 the font data, etc. used in the above mentioned document process, and stores in the ROM for data in the ROM 3 or the external memory 11 various data used in the above mentioned document process, etc. RAM 2 functions as the main memory, the work area, etc. of the CPU 1.

A keyboard controller (KBC) 5 controls the key input from a keyboard 9 and the pointing device not shown in the attached drawings. A CRT controller (CRTC) 6 controls the display of a CRT display (CRT) 10, which is a preferable example of display means. A disk controller (DKC) 7 controls the access to the external memory 11 such as a hard disk (HD), a floppy disk (FD), etc. storing a boot program, various applications, font data, a user file, an edit file, a printer control command generation program (hereinafter referred to as a printer driver) which is an example of a device driver, etc. A printer controller (PRTC) 8 is connected to a printer 1500 through a bidirectional interface (hereinafter referred to simply as an interface) 21, and performs a communications controlling process with the printer 1500 that is an image forming device and is a preferred example of a peripheral device of the present invention.

The CPU 1 performs a process of lusterizing an outline font to display information RAM set on, for example, the RAM 2, and enables the WYSIWYG on the CRT 10. The CPU 1 opens various windows recorded based on a command specified by a mouse cursor, etc. displayed on the CRT 10 which is operated by specification input from a mouse 23 which is a preferred example of input specification means, and performs various data processes. When a user performs a printing process, a window relating to a setting of printing is opened so that a printer can be set, and a printing process method for a printer driver including selection of a print mode can be set.

The printer 1500 is controlled by a CPU 12. The CPU 12 of the printer outputs an image signal as output information to a printing unit (printer engine) 17 connected to a system bus 15 based on a control program, etc. stored in a control program stored in the ROM for program of ROM 13, etc. or a control program, etc. stored in external memory 14. The program ROM of the ROM 13 stores a control program, etc. of the CPU 12. The ROM for font of the ROM 13 stores font data, etc. for use in generating the output information, and the ROM for data of the ROM 13 stores information, etc. used on a host computer when the printer has no external memory 14 such as a hard disk, etc.

The CPU 12 can communicate with the host computer through an input unit 18, and can notifies the host computer 3000 of the information, etc. in the printer. RAM 19 functions as main memory, a work area, etc. of the CPU 12, and is configured such that a memory capacity can be extended by optional RAM connected to an extension port not shown in the attached drawings. The RAM 19 is used as an output information extension area, an environment data storage area, NVRAM, etc. The above-mentioned external memory 14 such as a hard disk (HD), an IC card, etc. is access-controlled by a disk controller (DKC) 20. The external memory 14 is optionally connected, and stores font data, an emulation program, form data, etc. The input unit 18 is provided with a switch, an LED indicator, etc. for operation on the above mentioned operation panel.

The external memory 14 is not limited to a single unit, but a plurality of external memory units storing, in addition to the built-in font, an optional card, and a program for interpretation of different printer control language systems can be connected. Furthermore, it can be provided with NVRAM not shown in the attached drawings to store printer mode setting information from an operation panel, etc. not shown in the attached drawings.

Described below is the process performed by an installer, which is a preferred example of a control program for control of the information processing apparatus of the present invention. As a preferred OS environment of the present embodiment, Windows (trademark) of Microsoft Corporation is assumed, and different types of OS environments of Microsoft Corporation are assumed, but the OS is not limited to those of Microsoft. Furthermore, according to the present embodiment, a printer driver corresponding to different OS can be installed by a single installer, but an installer can be configured for each OS according to the present embodiment.

The installer according to the present embodiment can install not only a printer driver, but also a configuration information module which is software capable of cooperating with various services such as the management of a printer driver, device status information, etc., job management, etc. For example, configuration information module can be considered as software capable of cooperating with, for example, a printer. A configuration information module in the present embodiment can be a module group capable of inquiring of the printer 1500 connected to the host computer about the information such as equipment configuration information, etc. and notifying a printer driver of the result, and can be provided as a part of a driver module.

Figure 4:
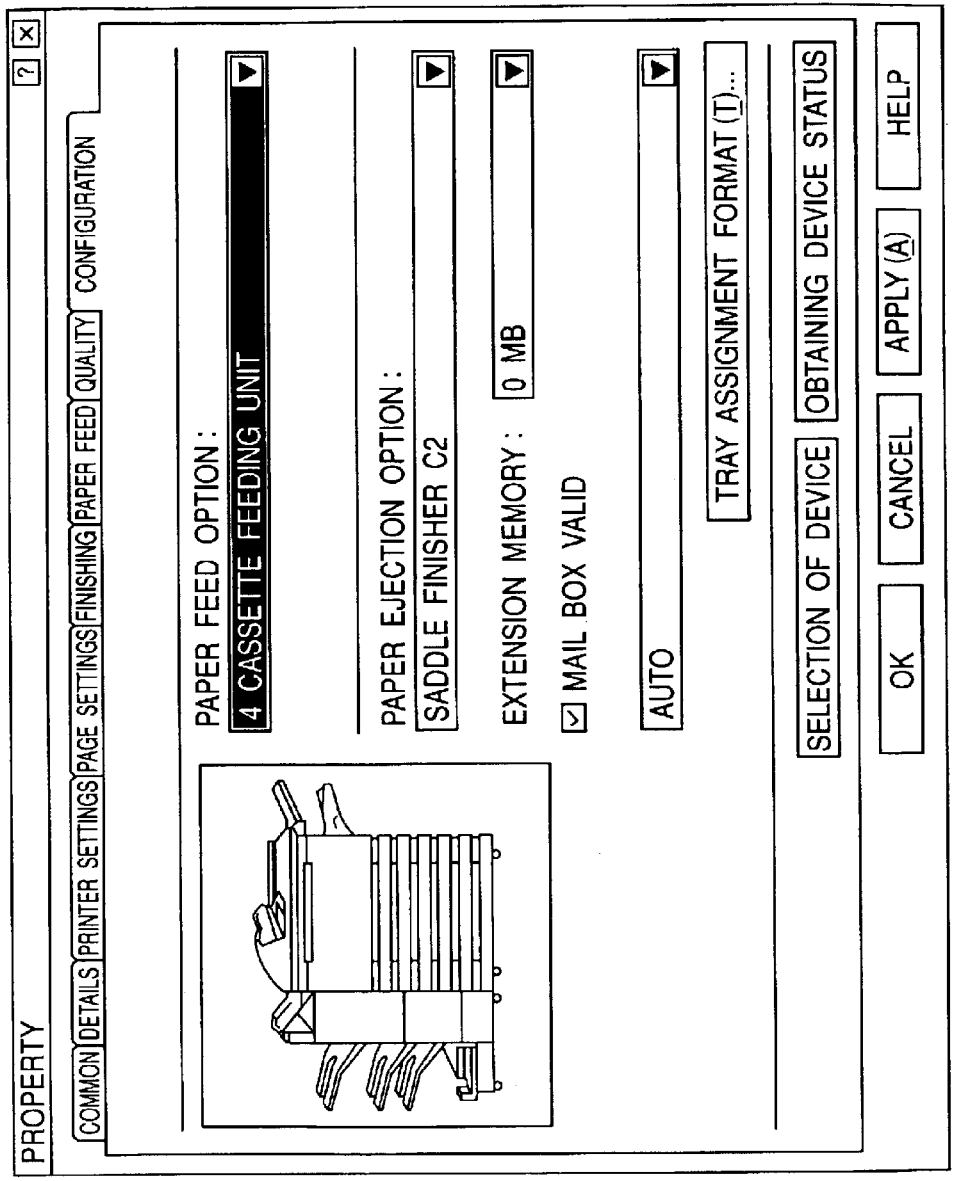
FIG. 4 shows a user interface of a printer driver.

FIG. 4 shows a user interface of a printer driver. The printer driver includes a configuration information module, and reflects and displays it on the user interface of the printer driver as shown in FIG. 4. For example, when a device status acquisition button shown in FIG. 4 is pressed using the mouse of the host computer 3000, the device driver cooperates with the configuration information module, and obtains and displays the information about the printer connected to the network. As described later, the installer according to the present embodiment can not only determine the installation result of the printer driver, but also determine whether or not the reboot is required according to the obtained information about the printer driver, and the information about the necessity of installing the configuration information module which is a module of providing a job management capability.

FIG. 14 shows a preferred printer system according to the present embodiment. In addition to the host computer 3000 and the printer 1500 shown in FIG. 1, a plurality of computers, for example, a second host computer 3001, a printer 1501, a printer 1502, etc. are connected through a network 1400 in FIG. 14. Furthermore, other computers and printers (not shown in the attached drawings) can be connected to a network. It is obvious that the network 1400 can be a cable LAN realized by Ethernet, etc., a wireless LAN, or a public circuit. According to the present embodiment, it is assumed that the host computer 3000 and the second host computer 3001 are provided with different types of OS.

Figure 2:
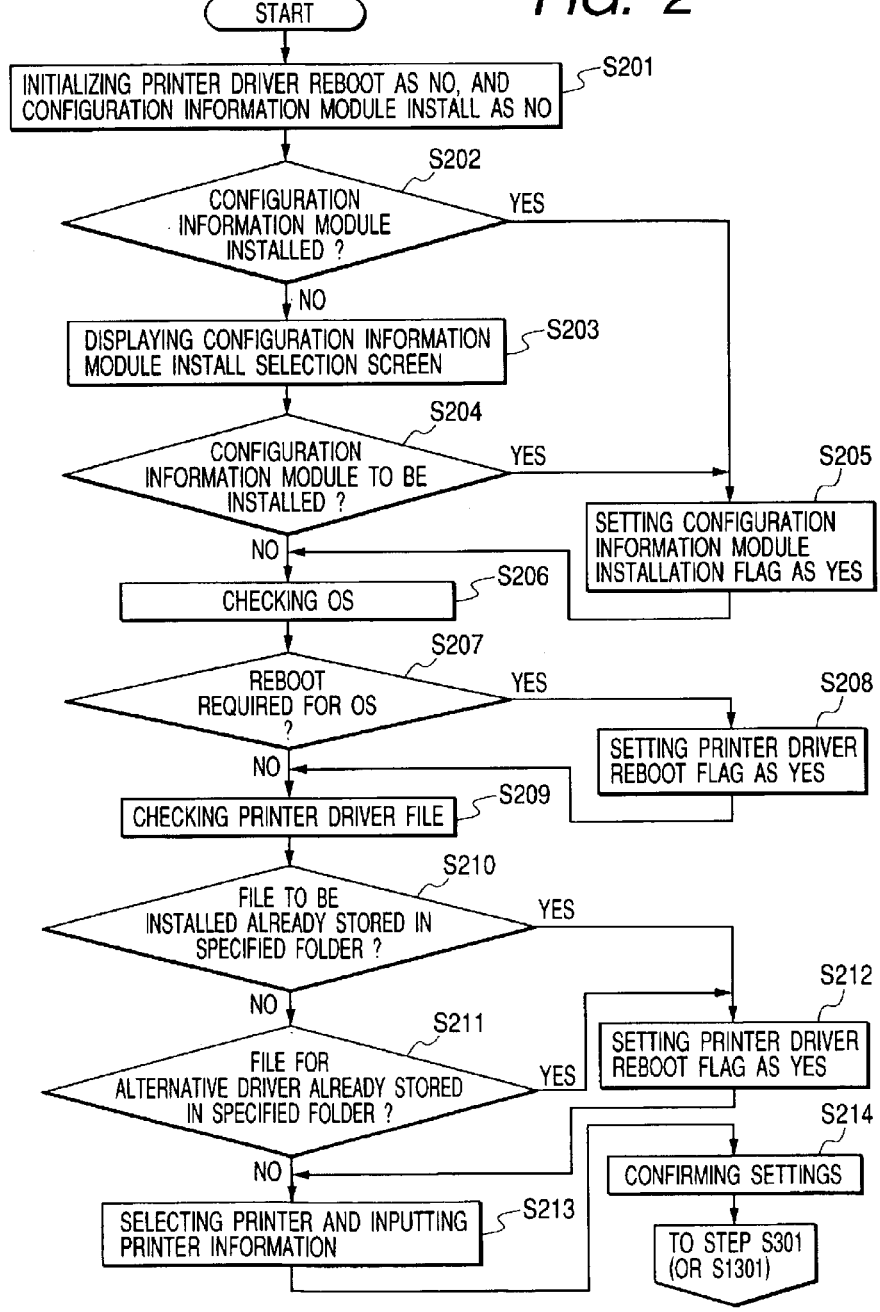
FIG. 2 shows an embodiment of installing a printer driver according to an embodiment of the present invention.
Figure 3:
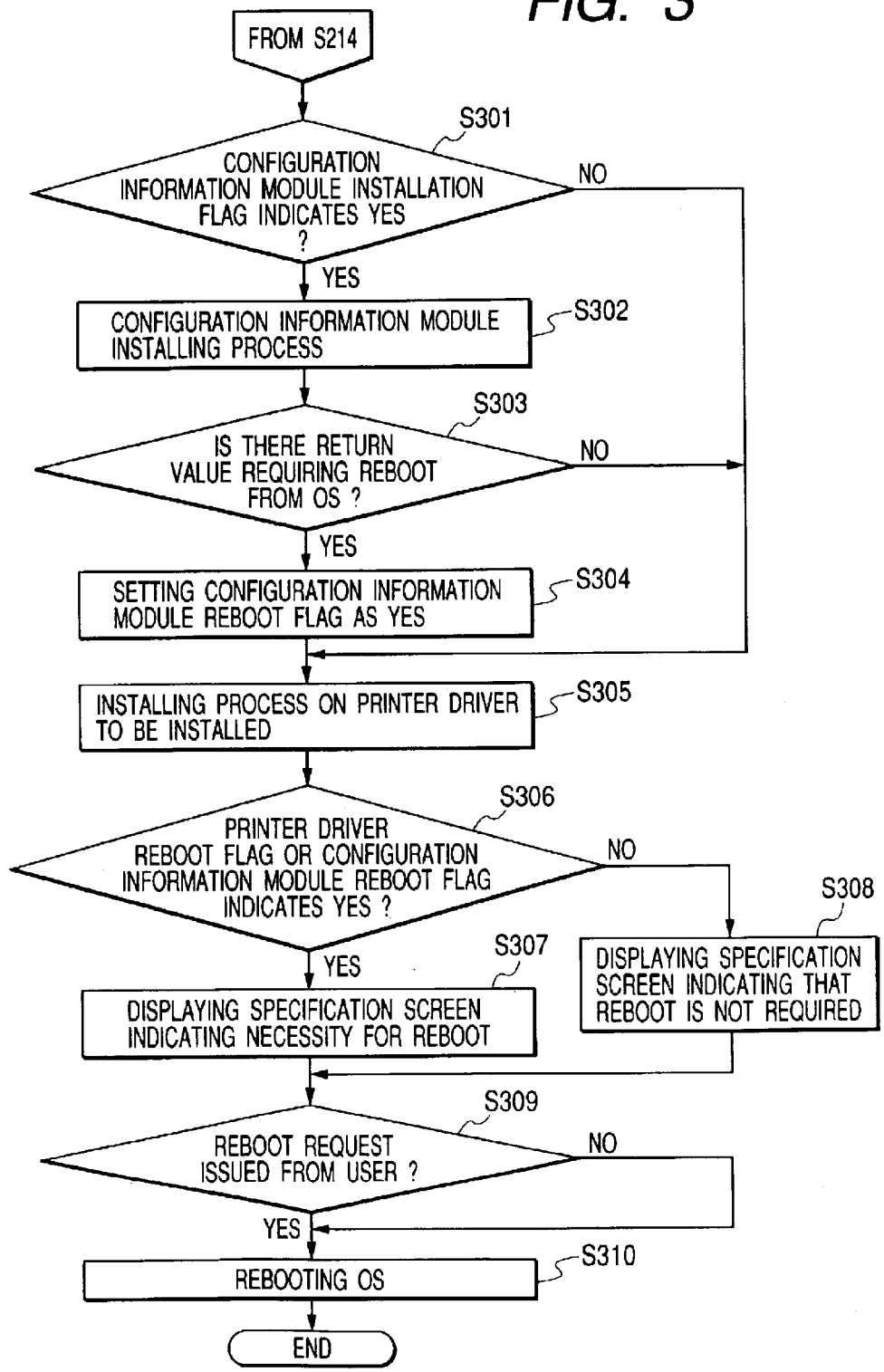
FIG. 3 shows an embodiment of a printer driver installing process continued from S204 shown in FIG. 2.

FIG. 2 shows an example of installing a printer driver according to the present embodiment. FIG. 3 shows an example of a printer driver installing process continued from S204 shown in FIG. 2. An embodiment of the present invention is described below in detail by referring to the flowcharts shown in FIGS. 2 and 3. The flowchart in FIG. 2 starts when an installer in a host computer is activated and an installation start instruction is input into the installer.

First, in step S201, the installer performs an initializing process. Practically, the installer sets a flag indicating whether or not the printer driver is to be rebooted to "NO," that is, sets the flag such that the printer driver cannot be rebooted when the installing process is performed. Simultaneously, the flag indicating whether or not the configuration information module is to be installed is set to "NO," that is, set such that the installation cannot be performed, and then the installing process is performed.

In step S202, the installer that is a software module determines whether or not the configuration information module has been installed. In step S202, when the installer determines that the configuration information module has been installed, control is passed to step S205, and the installer changes the configuration information module installation flag into "YES." If the configuration information module installation flag indicates "YES," then the installer of the present embodiment performs an updating process (overwrite installation) without issuing an inquiry to a user if the current version of the configuration information module of the device driver is the same as or older than the version of the device driver to be installed. Since the configuration information module according to the present embodiment is compatible with lower versions, the trouble of issuing an inquiry to a user as to whether or not the installation is performed can be omitted. In the present embodiment, a driver and a configuration information module to be installed are to be newer than the current units. If it is determined in S202 that a configuration information module has not been installed, then control is passed to step S203.

Figure 5:
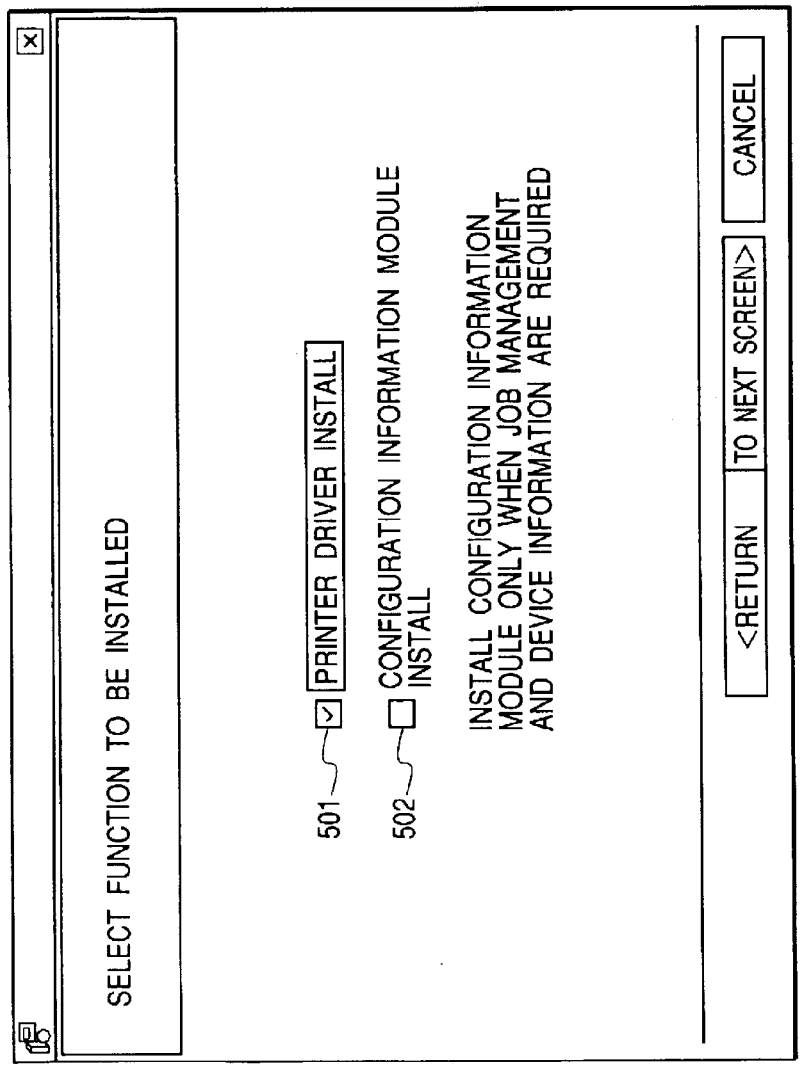
FIG. 5 shows a screen on which the specification of the selection as to whether or not a configuration information module is to be installed.

FIG. 5 shows the screen on which the selection as to whether or not a configuration information module is to be installed can be specified. The process in step S203 is performed when it is determined in S202 that a configuration information module has not been installed. In S203, the installer controls the process, which causes the OS to display the screen shown in FIG. 5, and awaits the input of the user. A reference numeral 501 denotes a printer driver install specification unit, and a reference numeral 502 denotes a configuration information install specification unit. The user checks the printer driver install specification unit 501 when a printer driver is installed, checks the configuration information install specification unit 502 when a configuration information module is to be installed, and presses the "next" button. When the printer driver install specification unit 501 or the configuration information install specification unit 502 is checked, the installer controls the process of storing the information in the external memory 11 which is an preferred example of storage means in the host computer, and control is passed to step S204.

In step S204, the installer controls the process of reading the information stored in the external memory, thereby making information determination as to whether or not the installation is to be performed. That is, if the installer determines according to the read information that the configuration information module is to be installed, that is, if the installer determines in S203 that the configuration information install specification unit has been checked, then control is passed to step S205, and the installer controls the process of changing the configuration information module installation flag into "YES," and control is passed to step S206. On the other hand, if the installer determines in S204 that the configuration information module is not to be installed, then control is passed directly to step S206.

In step S206, the currently operating OS is checked. In step S207, the installer determines whether or not the currently operating OS requires the reboot after the installation, and, if the reboot after the installation is requires, the installer changes the flag indicating that the reboot is required after the printer driver installation into "YES" in step S208. For example, the OS requiring the reboot includes WINDOWS 95 (trademark) because, for example, based on the specification of the module including a language monitor, etc. configured for the OS, the module providing a printing process service is not appropriately loaded or unloaded, and may require reboot to perform an appropriate operation. On the other hand, according to the present embodiment, it is not necessary to perform reboot on the OS using the so-called NT type kernel based on the specification of the driver module configured for the OS.

Thus, the installer (determination means) determines the necessity of performing reboot depending on the type of OS corresponding to the device driver to be considered in the installing process. When there is a printer driver corresponding to plural types of OS, reboot is required when a certain driver module corresponding to an OS is installed, but reboot is not required when another driver module corresponding to another OS is installed. Therefore, it is preferable to determine the necessity for an installing process based on a correspondence table between a driver and an OS requiring the reboot of the driver in the host computer.

Then, in step S209, all files are checked as to whether or not there is a file of a module configuring a printer driver under the directory in which a printer driver is to be installed. In this process, the file check is made on the printer drivers of all OS configuring the system including the second host computer 3001 in addition to an OS loaded into the host computer 300. In this process, the drivers for other OS are installed in the host computer 3000 in advance to correspond to the point & print capability supported in a specific OS, for example, the capability of installing a driver in the second host computer 3001 by issuing an instruction to perform an installing process to the host computer 3000 from the second host computer 3001 loaded with an OS different in type from the OS of, the host computer 3000. That is, an alternative driver for a printer driver operating in the OS of the second host computer 3001 is installed in the host computer 3000. This function can be realized by selecting a check box 903 for selecting whether or not an alternative driver is to be installed in FIG. 9 in S213 described later.

In step S210, if there is a file having the same name as the file configuring the printer driver to be installed in the directory on the installation side of the printer driver, then control is passed to step S212, and the printer driver reboot flag indicating that the reboot after the installation of the printer driver is required is changed into "YES." If the device driver the same in type as the printer driver to be installed has already been installed in the host computer, then the printer driver is overwritten, thereby rebooting the OS later to appropriately load and unload a module.

Thus, the installer (driver recognition means) recognizes whether or not there is a printer driver to be installed in the host computer 3000, and the installer (determination means) sets the printer driver reboot flag to "YES" when the printer driver to be installed is recognized as existing in the information processing apparatus. When the installer (determination means) reads the flag in S306 shown in FIG. 3 as described later, it determines that the reboot of the OS is required.

In step S210, if there is not a file having the same name as the file configuring the printer driver to be installed in the directory on the installation side of the printer driver, then control is passed to step S211. It is determined in step S211 whether or not there is a printer driver configuration file for the above mentioned other OS, that is, a file for an alternative driver. If "yes," then control is passed to step S212, the flag indicating that the reboot after the printer driver installation is required is set to "YES," and control is passed to step S213.

Figure 8:
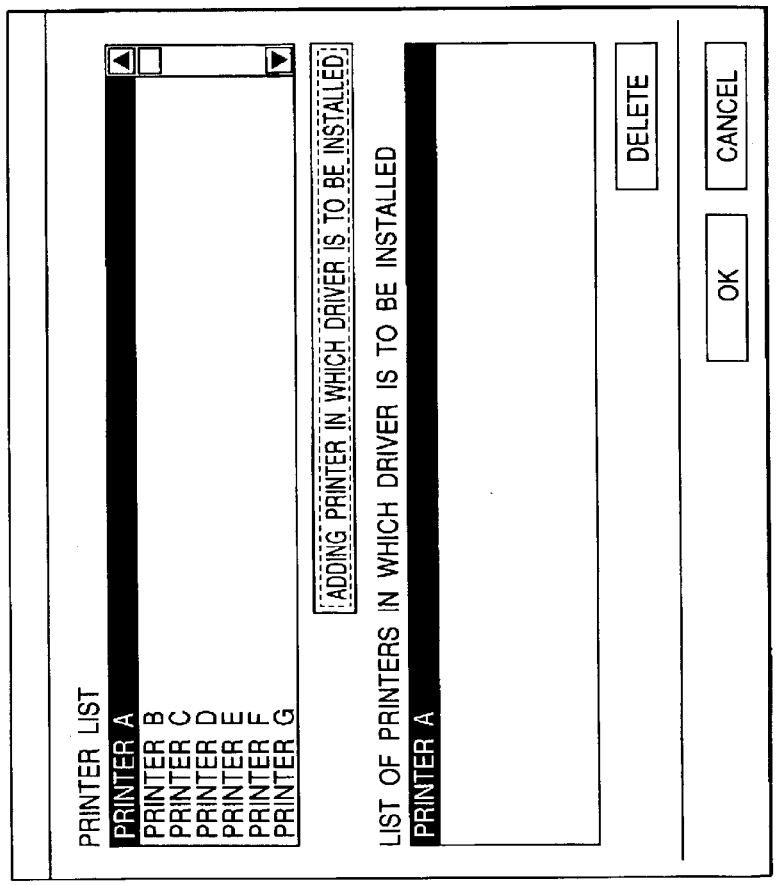
FIG. 8 shows a selection screen of a printer driver.

In step S213, the installer recognizes the printer driver corresponding to the connected printer 1500 based on the user selection. In FIG. 8, the printer A is displayed as a result of the user selecting a printer in the column of the list of the driver additional install printer. Correspondingly, the name of the driver to be installed is described. In FIG. 8, a plurality of printer drivers can be selected in one operation.

Figure 9:
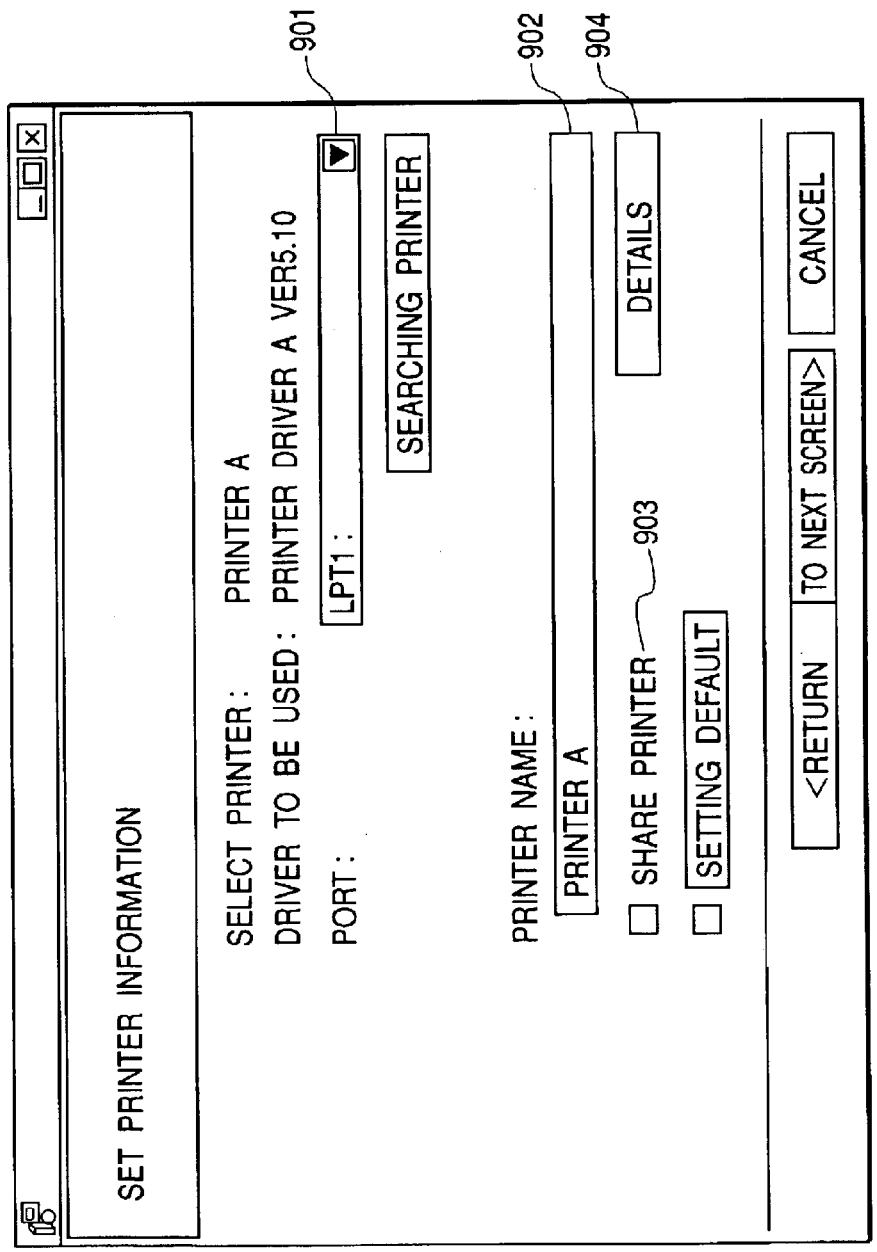
FIG. 9 shows a screen on which specification for printer information is input.
Figure 10:
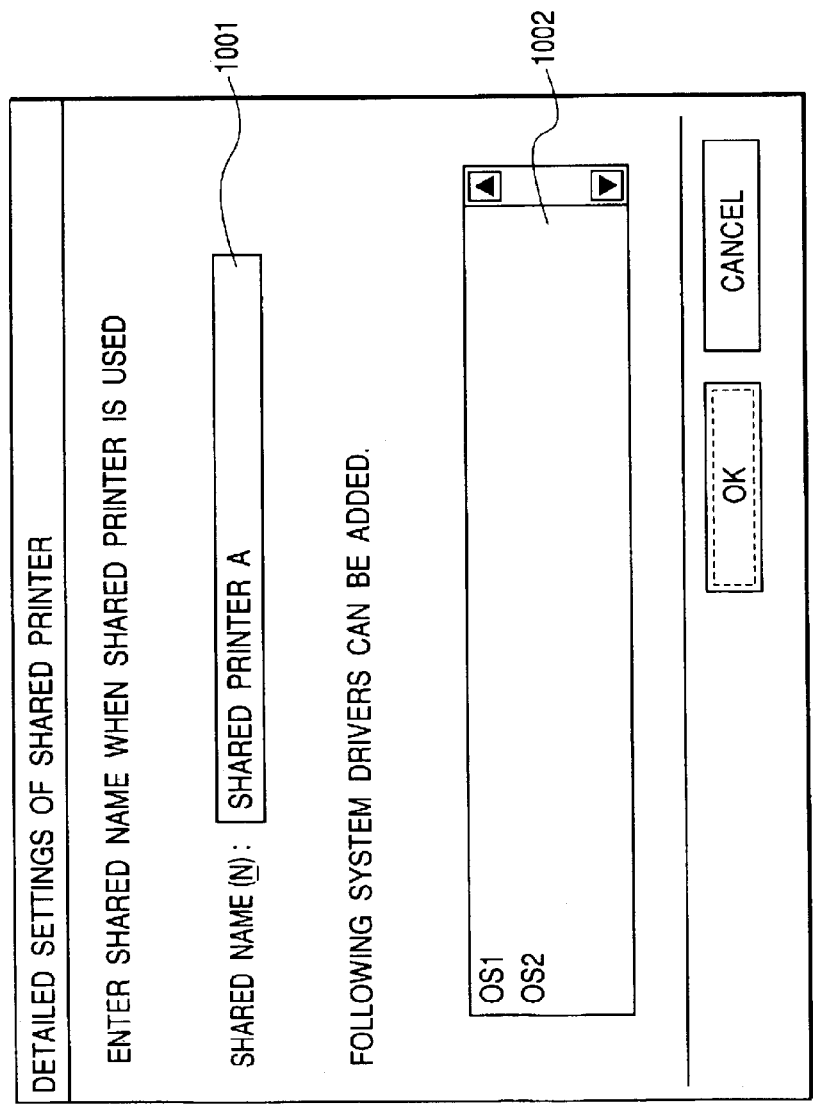
FIG. 10 shows a shared printer setting screen.

FIG. 9 shows the screen on which the specification of printer information is input. FIG. 10 shows the shared printer setting screen. On the setting screen shown in FIG. 9, the printer information for use in installing a printer driver is input. The specification of a port name specification unit 901 is input, and a friendly name input unit 902 inputs the name of a printer driver, which can be arbitrarily named in the user environment. When the check box 903 for selection as to whether or not an alternative driver is to be installed as shown in FIG. 9 is selected, it is preferable to display the screen shown in FIG. 10 in S213. A reference numeral 1001 denotes a shared printer name input unit, and a reference numeral 1002 denotes an OS specification unit corresponding to an alternative printer. FIG. 10 shows an input screen for information for use in installing an alternative driver in the host computer 3000 for the printer driver operating by the OS in the second host computer 3001 as indicated by the drawings shown in FIG. 14. The name of the OS provided for the second host computer 3001, etc. is the type of the OS loaded for the computer (omitted in the attached drawings) to be subscribed in the network is specified to be input using the alternative printer corresponding OS specification unit 1002. Then, the name of a shared printer for use in accessing the printer to be actually installed is input from the second host computer 3001, and the computer to be subscribed in a network to the shared printer name input unit 1001.

Figure 11:
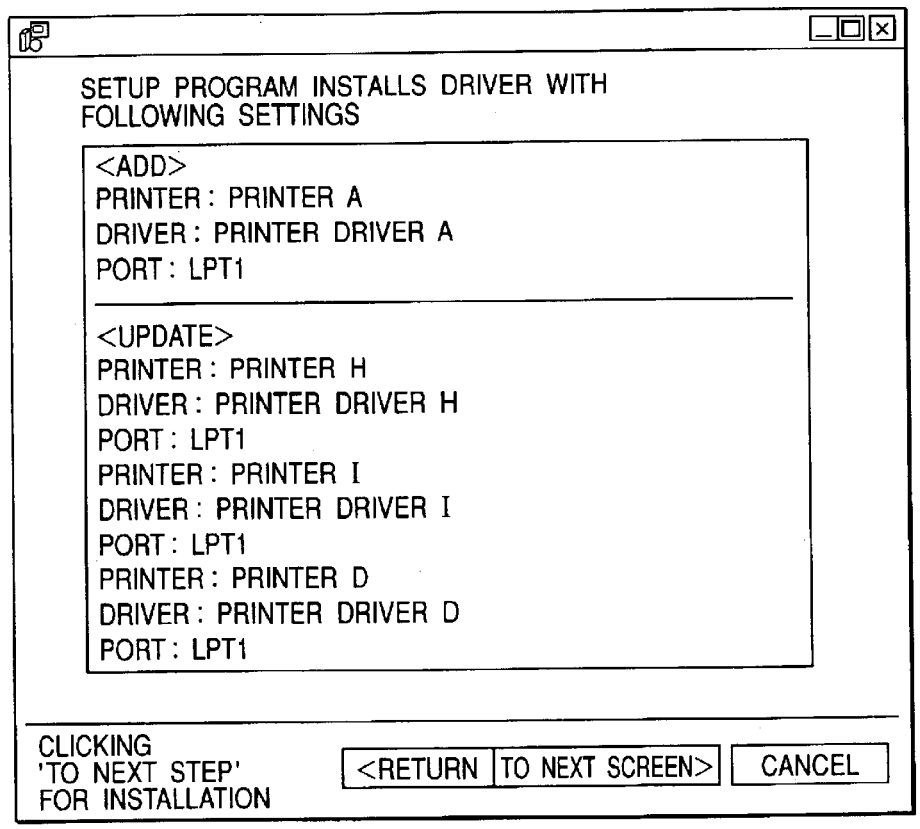
FIG. 11 shows a setting confirmation screen about a user selection and input results.

In step S214, the settings of the selection and input results by the user are confirmed. FIG. 11 shows a setting confirmation screen of user selection and input results. A printer A and the corresponding printer driver A are added to the shared printer name input unit 1001, and the already installed printers H, I, and D, and the corresponding printer drivers H, I, and D are displayed. If the "next" button is pressed, the printer driver A is additionally installed, and the printer drivers H, I, and D are update-installed (overwrite-installation). In the system shown in FIG. 11, the printer drivers H, I, and D have already existed in the host computer. Therefore, the printer driver reboots flag indicating the necessity for reboot in S205 is set to "YES."

In S210 according to the present embodiment, a plurality of printer driver installers originally provided for an installer are assumed to be printer drivers to be installed, and it is determined whether or not the driver to be installed has already been installed in the host computer. As a variation example, the installer (driver recognition means) recognizes a device driver to be installed based on an external selection specification input, and can recognize whether or not the driver to be installed has existed in the host computer 3000 by assuming that the recognized device driver is a driver to be installed.

In another variation example, when a part of a file configuring a printer driver of the installer according to the present invention overlaps a file configuring the printer driver not held in the installer according to the present invention, it can be determined that a driver requiring reboot has been installed.

Detailed explanation of the above mentioned variation example will be below performed by referring to FIGS. 15 and 16.

FIG. 15 shows a case in which the variation example is applied.

A reference numeral 1501 in FIG. 15 shows a file group configuring a printer driver (hereinafter referred to as the printer driver 1501 for explanation) installed in the host computer 3000, and their file versions. On the other hand, a reference numeral 1502 denotes a printer driver being installed by the installer according to the present invention (hereinafter referred to as a printer driver 1502). The printer driver 1501 is not provided for the installer according to the present invention, but has a file having the same name "COLORMOD.DLL" as a configuration file. In this example, the printer driver 1501 and the printer driver 1502 are printer drivers, which are provided by the same development source and are PDL printer drivers different in type from each other. "COLORMOD.DLL" is a color function module commonly used by the PDL.

PSDRV.DLL shown in FIG. 15 is a module corresponding to the PS language, and PCLDRV.DLL is a module corresponding to the PCL language. The numeral enclosed by the parentheses indicates the version of each module. PSDRVUI.DLL is a module for a user interface corresponding to the PS language (postscript language), and PCLDRVUI.DLL is a user interface module provided for a driver corresponding to the PCL language.

PSDRV.DLL, PCLDRV.DLL, etc. are modules of different types, but use COLORMOD.DLL as a function module commonly used for PDL.

An example of modules which are overwritten because they have the same module names although they are different driver modules can occur when the printer drives correspond to different PDLs having the common modules having the same names, and provided as a different install set from the same development source. It also occurs when another function module provided by the OS is also enclosed. In the example shown in FIG. 15, the version of "COLORMOD.DLL" included in the printer driver 1501 is 1.9.0, and the version of "COLORMOD.DLL" included in the printer driver 1502 is 1.9.4. If the printer driver 1502 is installed, "COLORMOD.DLL" of the printer driver 1501 is overwritten by the process of the OS or the installer. The function module commonly used by PDL is normally compatible between lower modules, and both printer drivers can normally operate after overwrite installation.

However, the overwritten "COLORMOD.DLL" may have been loaded by other DLL, etc. before the overwriting. Therefore, it is safer to reboot the OS to normally terminate the overwriting operation. Thus, the reboot flag can be set ON for a configuration file of a printer driver other than the printer driver to be installed if the file names match.

On the other hand, essentially the modules having different names cannot be overwritten. Furthermore, an independent module that is not a common module is not loaded and held by other modules although it is overwritten. Therefore, there may be no problem although a rebooting process is not performed.

When a module really requiring reboot is overwritten, it is determined whether or not the reboot is required based on whether or not the module has been overwritten, and the apparatus is controlled for reboot, thereby reducing the frequency of the rebooting operations, and improving the availability of a server, etc.

Figure 16:
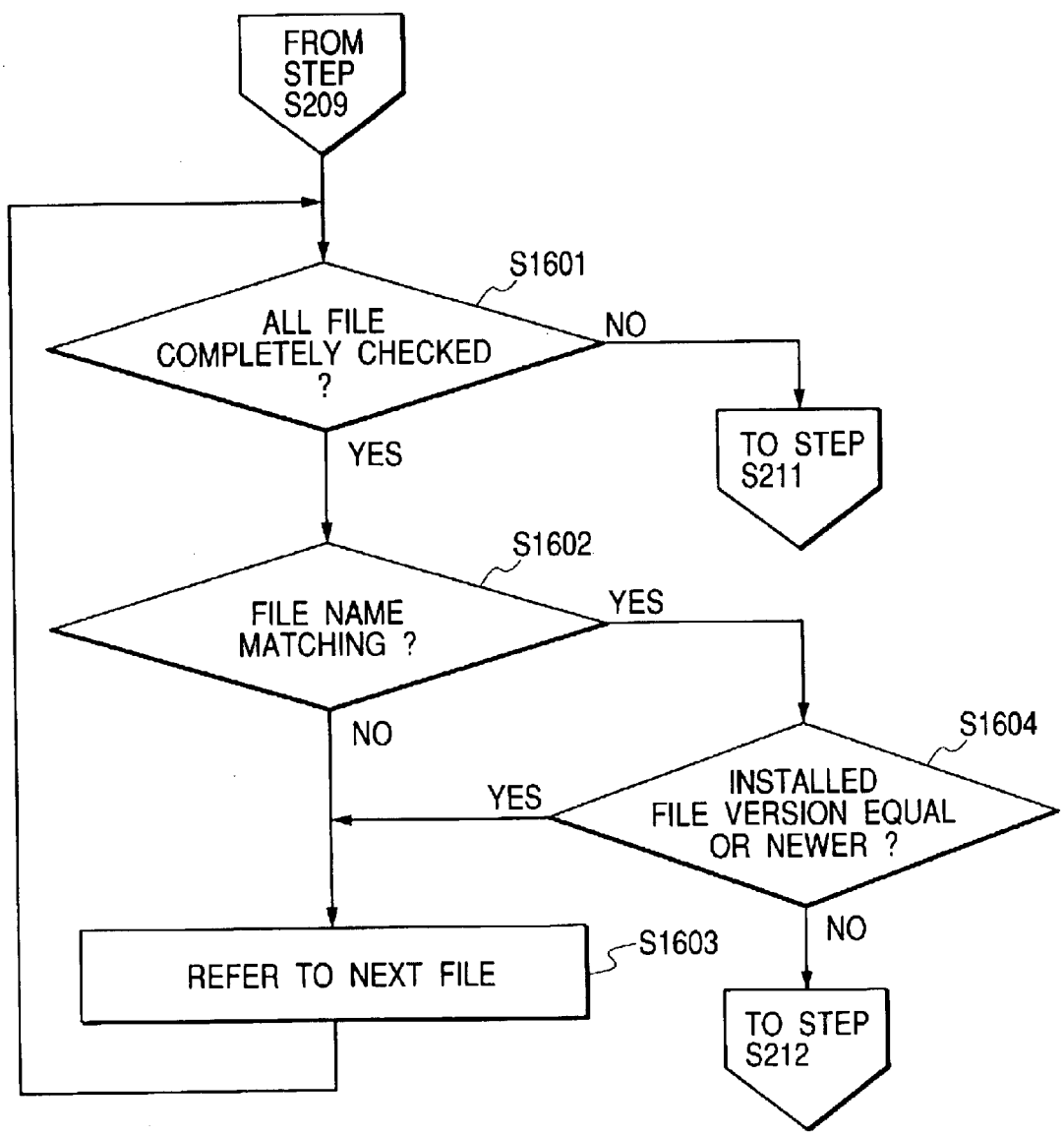
FIG. 16 shows an example of a process of a variation sample of an embodiment of the present invention.

FIG. 16 is a flowchart of the process of the above mentioned variation example. This process is performed in step S210.

In step S1601, it is determined whether or not the check has been completed as to whether or not all files to be installed have already existed in the specified folders for installation. If "yes," control is passed to step S211. If not, control is passed to step S1602.

It is checked in step S1602 whether or not a file having the same name as a file to be installed has already been stored in the specified folder. If there is a file having the matching name, then control is passed to step S1604. On the other hand, if there is no file having the matching name, then control is passed to step S1603, control is passed to the next check target file to be installed, and control is returned to step S1601.

In step S1604, a file version is confirmed if a matching file name is detected. If the file already stored in the specified folder has a newer version or the same version, then no overwriting process is performed, thereby returning control to step S1603. If the file already stored in the specified folder is an older version, an overwriting process is performed during installation. Therefore, it is determined that reboot is required, and control is passed to step S212.

In this flowchart, a file version is used in determining a file-overwrite. However, it is obvious that it can be determined according to the time stamp information about a file.

In the above mentioned processes, an appropriate reboot determining process can be performed while assuming a case in which configuration files to be installed can overlap although a printer driver is not the printer driver to be installed by the installer.

In step S301, the installer determines whether or not the configuration information module installation flag indicates "YES." If the installer determines in step S301 that the configuration information module installation flag indicates "YES," then control is passed to step S302, and the configuration information module installing process is performed. In the initializing process in S302, the installer which is a preferred example of the installation means of the present invention performs an OS service stopping process, a file copying process, a program recording process in the registry, and a service resuming process using an API provided by the OS as a series of installing processes. If an error code indicating the necessity for reboot is returned in the return value from the API to be used as a result of the present installing process, then the installer controls the OS to store the value of "YES." This flag is stored as installation information as a value indicating the installation state when the configuration information module is installed. Practically, the installer controls the OS to store the value of "YES" in the registry defined in the OS.

In S303 after S302, the installer determines whether or not there is a return value indicating the necessity for reboot as a return value of the API of the OS as a result of the above-mentioned installing process. The configuration information installation flag is set to "YES" when the API of the OS is installed and a return value indicating that reboot is required, and the processes of providing the services such as a spool monitor, the job management, the device management, etc. require initialization by rebooting the host computer including the OS to release the state of monopoly by other processes.

If the installer determines in S303 that there is a return value indicating that the reboot is required, and determines that the OS is to be rebooted, then the installer issues an instruction in S304 to the OS to set the configuration information reboot flag to "YES," and control is passed to step S305. It is obvious that each flag is written by the installer itself. If the installer determines in S303 that there is no return value from the APS indicating that reboot is required, then control is passed to step S305.

In S305, a module of a printer selected in S213 is selected from the printer driver stored in the specified folder, and an installing process is performed, and control is passed to step S306. In S305, practically, the file copying process, and a recording process in the system using the API provided by the OS, are performed.

In S306, the installer determines whether or not at least one of the printer driver reboot flag, and the configuration information module reboot flag indicates "YES." That is, the installer that is a preferred example of the determination means according to the present invention determines whether or not the reboot of the OS, which is a preferred example of the control program in the host computer 3000 is required. Furthermore, when the configuration information module installation flag indicates "YES," it can be determined whether or not the reboot of the program for providing a state management service of the print device as a preferred example of the control program is required based on the return value of the API of the OS used during installation.

Figure 6:
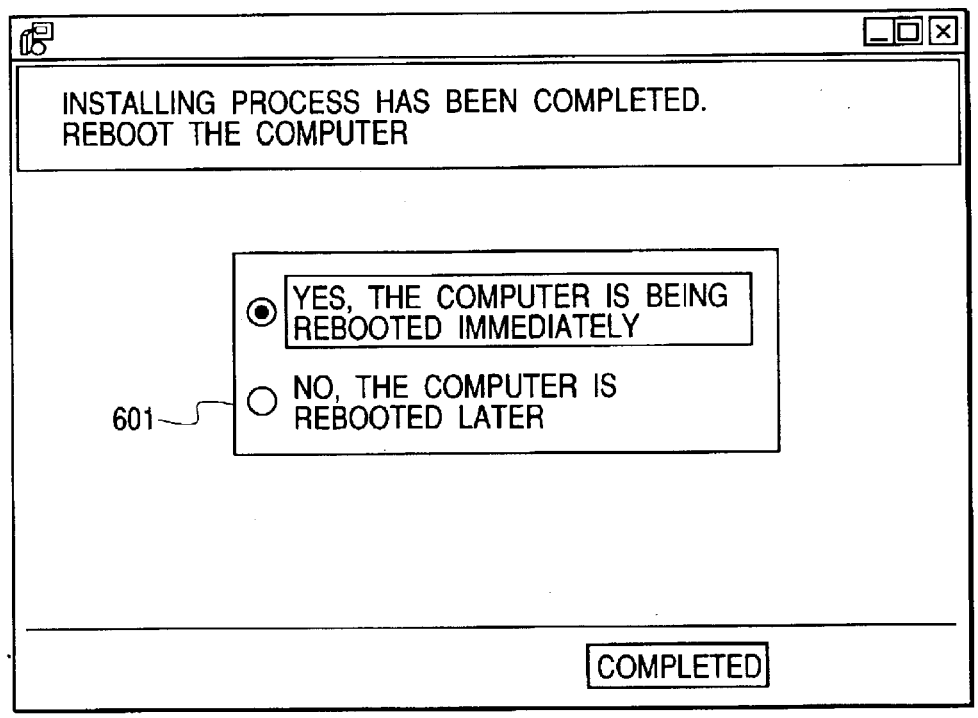
FIG. 6 shows a display screen of an installer.
Figure 7:
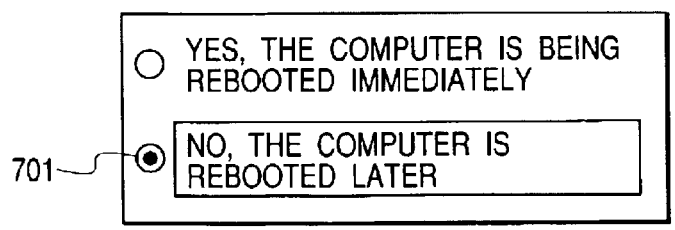
FIG. 7 shows a reboot specification input screen of an installer.

FIG. 6 shows a display screen of an installer. FIG. 7 shows a reboot specification input screen of an installer. If either of the printer driver reboot flag or the configuration information module installation flag indicates "YES" in S306, then a specification screen reflecting the necessity for reboot is displayed. Practically, it controls the OS to display the screen as shown in FIG. 6. At this time, if the contents of the printer driver reboot flag is "YES," then the installer which is a preferred example of the display control means according to the present invention passes control to S307, and controls the OS to set and display an option of rebooting as a default (initial value) using an option 601 on the display screen shown in FIG. 6. If the contents of the printer driver reboot flag is "NO" in S308, then the installer instructs the OS to set and display an intention not to perform reboot using the option 601 shown in FIG. 6 as an initial value, and awaits user input (FIG. 7). That is, the installer (display control means) controls the OS to set and display the display screen on which the necessity for reboot can be specified and selected as a display screen for reboot as a default, and awaits specification input for reboot.

In step S309, if a user input value as to whether or not reboot is required is determined, and a rebooting process is selected, then control is passed to step S310, and the OS is rebooted, thereby terminating the process. On the other hand, when no reboot is selected in S309, the process terminates immediately.

The installer which is a preferred example of a display control means of the present invention can control and display a display screen on which reboot can be specified when the installer (determination means) determines that the reboot is required, and can control not to display the screen on which reboot can be specified if the installer (determination means) determines that the reboot is not required.

As described above, since it is determined whether or not reboot is required depending on the type of OS, the determination as to whether or not reboot is required can be made by referring to, for example, a table without complicated implementation. Additionally, for example, using a return value from the API of the OS, the necessity for reboot can be determined, thereby utilizing the existing API, and successfully reducing the number of developing steps.

(Second Embodiment)

FIG. 13 shows a variation example of the process shown in FIG. 3. The processes up to S214 shown in FIG. 2 are common. Described below are the portions different from those in the first embodiment.

The processes in S1301 to S1306 are the same as those shown in FIG. 2, but the processes in S1307 and S1308 are different as described below.

In step S1301, the installer determines whether or not the configuration information module installation flag indicates "YES." Then, if the installer determines in S1301 that the configuration information module installation flag indicates "YES," then control is passed to step S1302, and the configuration information module installing process is performed. In the installing process in S1302, the installer which is a preferred example of installation means according to the present invention performs an OS service stopping process, a file copying process, a program recording process in the registry, and a service resuming process using an API provided by the OS. If an error code indicating the necessity for reboot is returned in the return value from the API as a result of the present installing process, then the installer controls the OS to store the value of "YES." Thus, the installer (determination means) that has installed the installation configuration module obtains an installation result of the installation configuration module, and can determine the necessity for reboot depending on the installation result of the program module. This flag is stored as installation information as a value indicating the installation state when the configuration information module is installed. Practically, the installer controls the OS to store the value of "YES" in the registry defined in the OS. On the other hand, if the installer determines that the configuration information module flag is not "YES" in S1301, then control is passed to step S1305.

Back in S1302, control is passed to step S1303, and the installer determines whether or not there is a return value indicating the necessity for reboot as a return value of the API of the OS as a result of the above-mentioned installing process. The configuration information installation flag is set to "YES" when the API of the OS is installed and a return value indicating that reboot is required, and the processes of providing the services such as a spool monitor, the job management, the device management, etc. require initialization by rebooting the host computer including the OS to release the state of monopoly by other processes.

If the installer (determination means) determines in S1303 that there is a return value indicating that the reboot is required, and determines that the OS is to be rebooted, then the installer issues an instruction in S1304 to the OS to set the configuration information reboot flag to "YES," and control is passed to step S1305. It is obvious that each flag is written directly by the installer.

If the installer determines in S1303 that there is no return value from the APS indicating that reboot is required, then control is passed to step S1305. In S1305, a module of a printer selected in S213 is selected from the printer driver stored in the specified folder, and an installing process is performed, and control is passed to step S1306. In S1305, practically, the file copying process, and a recording process in the system using the API provided by the OS, are performed.

In S1306, the installer determines whether or not at least one of the printer driver reboot flag, and the configuration information module reboot flag indicates "YES." That is, the installer that is a preferred example of the determination means according to the present invention determines whether or not the reboot of the OS, which is a preferred example of the control program in the host computer 3000 is required. Otherwise, as a preferred example of a control program, when the configuration information module installation flag indicates "YES," it can be determined whether or not the reboot of the program for providing a state management service of the print device is required based on the return value of the API of the OS used during installation.

In S1306, if the installer (determination means) determines that at least one of the printer driver reboot flag and the configuration information module reboot flag indicates "YES," and reboot is required, then control is passed to step S1307, and controls the OS to automatically reboot without awaiting user input, thereby terminating the process. If the installer (determination means) determines that none of the printer driver reboot flag and the configuration information module reboot flag indicate "YES" and reboot is not required, then it displays the information that the installing process has been appropriately completed on the CRT of the host computer 3000 without displaying the reboot specification input screen in S1308, thereby terminating the process.

Furthermore, the installer installs the installation configuration module for connection to the service of obtaining the status of a printer by cooperating with the device driver, and determines the necessity for reboot upon receipt of a response that the reboot is necessary through the application programming interface of the OS in the host computer 3000. The service includes obtaining the status of a printer, the information about the presence/absence of a consumable material, the state of the network connection of a printer, the division management relating to the count of copies in the printing process, etc.

The reboot according to the present embodiment includes not only a part or all of the reboot of the power unit used by the host computer, but also the reboot on the OS only and the reboot of the control program for providing a service.

That is, when the printer driver reboot flag is "YES," and when the OS can be rebooted without stopping the power supply to the host computer, the installation can possibly be completed by the reboot of the OS only. Furthermore, when the configuration information reboot flag is "YES," only the control program for providing a service may have to be rebooted.

As described above, if the installer determines that reboot is required, the reboot is automatically performed. Therefore, the user can be free of difficult determination. Furthermore, when the installer determines that reboot is not required, the screen for reboot is not displayed. Therefore, the user can continue the necessary process currently being performed without interruption.

(Third Embodiment)

According to the first embodiment, in the method of displaying the determination result as to whether or not reboot is required, the initial value on the display is changed using a radio button 601. However, when reboot is required as in the present embodiment, the radio button 601 is replaced with a message that reboot is being performed, and the reboot is automatically performed. On the other hand, if the reboot is not required, then the reboot result display can be omitted, and the installing process can be terminated.

Thus, the determination as to whether or not the OS is to be rebooted after the installation can be displayed in a plurality of display methods, and the method for modifying the display methods is described below.

Figure 12:
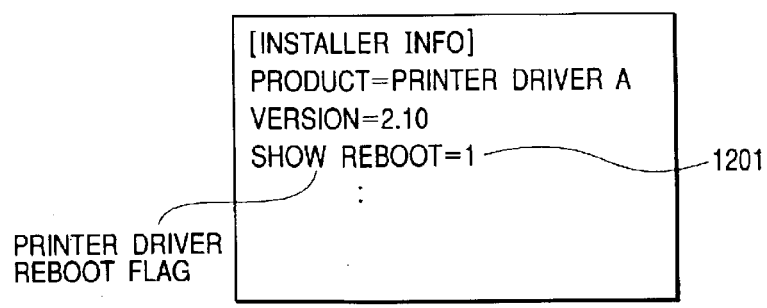
FIG. 12 shows a part of the contents of the description of a setting file included in a file configuring an installer.

FIG. 12 shows a part of the contents of the description of the setting file. The setting file is read when the installer is activated, and the operation method is determined. As shown in FIG. 12, for example, the printer driver reboot flag can be described as "ShowReboot=1" in the text format, or can be held in binary as internal information in the file managed by the installer. The configuration information reboot flag and the printer driver reboot flag can be similarly managed.

As described above, according to the present embodiment, it is determined whether or not the reboot after the installing process is required, and the determination result is displayed on the last process screen, thereby providing a user-desired installer.

(Other Embodiments)

The processes shown in FIGS. 2, 3, and 13 according to the present embodiment can be performed by each of the host computer 3000, the second host computer 3001, a print site 109. In this case, the present invention can be applied when an information group including a program is provided for the host computer using a storage medium such as CD-ROM, flash memory, an FD, etc. or an external storage medium through a network.

As described above, it is obvious that the objects of the present invention can be attained by providing a storage medium storing a program code of the software realizing the functions of the above mentioned embodiments for the system or the apparatus, or downloading it from an external server (not shown in the attached drawings) so that the computer (or CPU or MPU) of the system or apparatus reads out and executes the program code stored on the storage medium.

In this case, the program code read from the storage medium realizes a new function of the present invention, and the storage medium storing the program code configures the present invention. The storage medium for providing the program code can be, for example, a floppy disk, a hard disk, an optical disk, a magneto-optic disk, a DVD, a CD-ROM, a magnetic tape, a non-volatile memory card, a ROM, an EEPROM, etc.

Furthermore, the functions according to the above mentioned embodiments can be realized by executing the program code read by the computer, and the OS (operating system) operating on the computer, etc. can perform a part or all of the actual processes according to the instruction of the program code, and the functions according to the above mentioned embodiments can be realized by the processes obviously. Furthermore, after the program code read from the storage medium is written to the memory provided for the feature extension board inserted into the computer and the feature extension unit connected to the computer, the CPU, etc. provided for the feature extension board and the feature extension unit can perform a part or all of the actual processes at an instruction of the program code to realize the functions of the above mentioned embodiments according to the present invention.

As described above, according to the present invention, it is determined whether or not reboot is required when a device driver is installed in a computer, and the system on the installation side is controlled based on the determination result, thereby performing necessary reboot while avoiding unnecessary reboot, and performing an appropriate installing process of a software module.

Furthermore, when a device driver is installed in a computer, it is determined whether or not reboot is required, and the screen for reboot is configured and displayed based on the determination result, thereby releasing the user from a difficult determination on the necessity for reboot, and allowing the user to perform an appropriate installing process.

What is claimed is:

1. A control method of an information processing apparatus that can be loaded with a device driver comprising:

an installing step of installing a device driver;

a determining step of determining whether or not reboot of a control program in the information processing apparatus is required when the device driver is installed in said installing step; and a display controlling step of controlling display of a display screen for allowing a user to enter an instruction for reboot, wherein when it is determined that reboot is required in said determining step, said display controlling step controls the display screen to present as a default a parameter indicating that reboot is required, and when it is determined that reboot is not required in said determining step, said display controlling step controls the display screen to present as a default a parameter indicating that reboot is not required.

2. The control method according to claim 1, wherein in said display controlling step, the display screen on which reboot can be specified is controlled so as to be displayed when it is determined in said determining step that reboot is required, and the display screen on which reboot can be specified is controlled so as not to be displayed when it is determined in said determining step that reboot is not required.

3. The control method according to claim 1, further comprising:

a driver recognizing step of recognizing presence/absence of a device driver to be installed in the information processing apparatus, wherein in said determining step, it is determined that reboot is required when, in said driver recognizing step, a presence of a device driver to be installed is recognized in the information processing apparatus.

4. The control method according to claim 3, wherein in said driver recognizing step, a device driver to be installed is recognized based on external input of a selection specification, and presence/absence of the device driver in the information processing apparatus is recognized.

5. The control method according to claim 1, wherein in said determining step, when presence of a configuration module of a device driver to be installed in the information processing apparatus is recognized in said driver recognizing step, a version of the device driver is checked, and it is determined that reboot is required when the configuration module of the device driver to be installed is installed.

6. The control method according to claim 1, wherein the reboot refers to a part or all of reboot on a power unit used by the information processing apparatus.

7. The control method according to claim 1, wherein:
in said installing step, a program module for connection to a service in cooperation with a device driver is further installed; and
in said determining step, it is determined whether or not reboot is required depending on an installation result about the program module.

8. The control method according to claim 7, wherein
the program module connects a service of obtaining a state of a device; and
in said determining step, it is determined that reboot is required upon receipt of a response of a notification that reboot is required through the application programming interface of an OS in the information processing apparatus.

9. A method of installing a device driver in an information processing apparatus comprising:
an installing step of installing a device driver;
a recognizing step of recognizing a type of an operating system loaded in the information processing apparatus; and
a determining step of determining whether or not reboot of a control program in the information processing apparatus is required, in accordance with whether a type of the operating system recognized in said recognizing step is a predetermined type.

10. The control method according to claim 1 or 9, wherein
in said determining step, necessity for reboot is determined depending on an OS corresponding to a device driver to be installed.

11. A method according to claim 9, further comprising a step of automatically performing reboot when it is determined in said determining step that reboot is required.

12. A computer-readable storage medium storing a control program executed in an information processing apparatus which an be loaded with a device driver, comprising:
an installing step of installing a device driver;
a determining step of determining whether or not reboot of a control program in the information processing apparatus is required when the device driver is installed in said installing step; and
a display controlling step of controlling display of a display screen for allowing a user to enter an instruction for reboot, wherein when is determined that reboot is required in said determining step, said display controlling step controls the display screen to present as a default a parameter indicating that reboot is required, and when it is determined that reboot is not required in said determining step, said display controlling step controls the display screen to present as a default a parameter indicating that reboot is not required.

13. A computer-readable storage medium storing a control program of installing a device driver to an information processing apparatus, wherein:
the information processing apparatus is allowed to perform:
an installing step of installing a device driver;
a recognizing step of recognizing a type of an operating system loaded in the information processing apparatus; and
a determining step of determining whether or not reboot of a control program in the information processing apparatus is required, in accordance with whether the type of the operating system recognized in said recognizing step is a predetermined type.

14. A storage medium according to claim 13, wherein the information processing apparatus is further allowed to perform a step of automatically performing reboot when it is determined in said determining step that reboot is required.

15. An information processing apparatus capable of being loaded with a device driver, comprising:
installing means for installing a device driver;
determining means for determining whether or not reboot of a control program in the information processing apparatus is required when the device driver is installed by said installing means; and
display controlling means for controlling display of a display screen for allowing a user to enter an instruction for reboot, wherein when it is determined that reboot is required by said determining means, said display controlling step controls the display screen to present as a default a parameter indicating that reboot is required, and when it is determined that reboot is not required in said determining step, said display controlling step controls the display screen to present as a default a parameter indicating that reboot is not required.

16. An information processing apparatus of installing a device driver to an information processing apparatus, comprising;
installing means for installing a device driver;
a recognizing step of recognizing a type of an operating system loaded in the information processing apparatus; and
determining means for determining whether or not a reboot of control program in the information processing apparatus is required, in accordance with whether the type of the operating system recognized in said recognizing step is a predetermined type.

17. An apparatus according to claim 16, further comprising means for automatically performing reboot when it is determined by said determining means that reboot is required.

18. An information processing apparatus capable of being loaded with a device driver, comprising:
an installing unit, adapted for installing a device driver;
a determining unit, adapted for determining whether or not reboot of a control program in the information processing apparatus is required when the device driver is installed by said installing unit; and
a display controlling unit, adapted for controlling display of a display screen for allowing a user to enter an instruction for reboot, wherein when it is determined that reboot is required by said determining unit, said display controlling step controls the display screen to present as a default a parameter indicating that reboot is required, and when it is determined that reboot is not required in said determining step, said display controlling step controls the display screen to present as a default a parameter indicating that reboot is not required.

19. An information processing apparatus of installing a device driver to an information processing apparatus, comprising:

an installing unit, adapted for installing a device driver;

a recognizing step of recognizing a type of an operating system loaded in the information processing apparatus; and a determining unit, adapted for determining whether or not reboot of a control program in the information processing apparatus is required, in accordance with whether the type of the operating system recognized in said recognizing step is a predetermined type.

20. An apparatus according to claim 19, further comprising a unit for automatically performing reboot when it is determined by said determining unit that reboot is required.

* * * * *

UNITED STATES PATENT AND TRADEMARK OFFICE
CERTIFICATE OF CORRECTION

PATENT NO. : 6,965,953 B2
APPLICATION NO. : 10/359641
DATED : November 15, 2005
INVENTOR(S) : Kujirai It is certified that error appears in the above-identified patent and that said Letters Patent is hereby corrected as shown below:

COLUMN 2:
Line 15, "mean" should read -- means --.

COLUMN 4:
Line 12, "notifies" should read -- notify --.

COLUMN 6:
Line 30, "requires," should read -- required, --.

COLUMN 7:
Line 12, "the same" should read -- is the same --.

COLUMN 15:
Lines 23 and 42, "wherein" should read -- wherein: --;
Line 51, "an" should read -- can --; and
Line 60, "is determined" should read -- it is determined --.

COLUMN 16:
Line 38, "prising;" should read -- prising: --.

Signed and Sealed this

Seventeenth Day of October, 2006

JON W. DUDAS
*Director of the United States Patent and Trademark Office*